United States Patent Office 3,496,181
Patented Feb. 17, 1970

---

3,496,181
2 - AMINOCYCLOALKYL HYDROQUINONES, ESTERS, ETHERS AND N-OXIDES THEREOF, AND A PROCESS FOR PREPARING THE SAME
Louis L. Skaletzky, Kalamazoo, Mich., assignor to The Upjohn Company, Kalamazoo, Mich., a corporation of Delaware
No Drawing. Continuation-in-part of application Ser. No. 334,934, Dec. 31, 1963. This application Oct. 24, 1966, Ser. No. 588,724
Int. Cl. C07d 51/70, 87/28, 93/10
U.S. Cl. 260—268                      16 Claims

ABSTRACT OF THE DISCLOSURE

New (2-aminocycloalkyl)hydroquinones, their esters, ethers, and N-oxides are prepared by first condensing p-benzoquinone with a cycloalkenamine to obtain new cycloalkenamine-p-benzoquinone adducts which adducts are then cleaved by hydrogenolysis to obtain the desired (2 - aminocycloalkyl)hydroquinones. Preparations of esters, ethers, and N-oxides are described. The new compounds are, in general, inhibitors of pseudocholinesterase and can be used as CNS stimulants. The equanimity of treated animals is improved. The new ethers are also useful as diuretics.

---

This application is a continuation-in-part of now abandoned application Ser. No. 334,934 filed Dec. 31, 1963.

This invention pertains to novel organic chemical compounds and to a process for preparing the same. More particularly, the invention is directed to novel cycloalkenamine-p-benzoquinone adducts, (2-aminocycloalkyl) hydroquinone hydrogenolysis products thereof, esters and ethers of said adducts and hydrogenolysis products, and a process for preparing the same.

The novel cycloalkenamine-p-benzoquinone adducts of this invention have, in their free base form the structural formula:

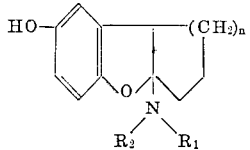

I wherein $n$ is an integer from 1 to 3, inclusive; $R_1$ and $R_2$, taken separately, are selected from the group consisting of lower-alkyl, aralkyl of from 7 to 12 carbon atoms, inclusive, phenyl, and substituted phenyl selected from the group consisting of lower-alkylphenyl, lower-alkoxyphenyl, and halophenyl, provided that $R_1$ and $R_2$ are not simultaneously selected from phenyl and substituted phenyl; and $R_1$ and $R_2$ taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

The novel (2-aminocycloalkyl)hydroquinone hydrogenolysis products of this invention have, in their free base form, the structural formula:

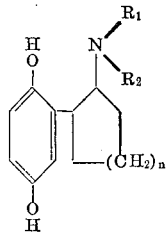

II wherein $n$, $R_1$, and $R_2$ are as defined above.

The novel free base compounds of Formulas I and II can be reacted with acids to form acid addition salts. Furthermore, the compounds of Formulas I and II can be oxidized to form amine oxides, i.e., N-oxides. The novel acid addition salts and N-oxides of the novel compounds of Formulas I and II are useful compounds in accordance with the invention and are, therefore, contemplated as embodiments of the invention.

The hydroxyl groups of the compounds of Formulas I and II can be acylated to form esters and alkylated to form ethers. The esters and ethers are also useful compounds in accordance with the invention, and are, therefore, contemplated as embodiments thereof. Moreover, the ethers are active as diuretics, and can be used to increase urinary excretion in animals. Hence, the free base compounds of the invention can be represented by the structural formulas:

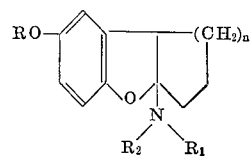

III and

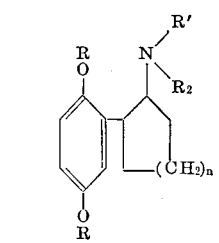

IV respectively, wherein $n$, $R_1$ and $R_2$ are as defined above, and R is hydrogen, lower-alkanoyl, lower-alkyl, or benzyl. The esters and ethers of Formulas III and IV also form acid addition salts and N-oxides according to the invention.

As employed herein, the term "lower-alkanyl" means the acyl group of any alkanoic acid of from 1 to 6 carbon atoms, inclusive, for example, formyl, acetyl, propionyl, butyryl, isobutyryl, valeryl, caproyl, and the like. The term "lower-alkyl" includes methyl, ethyl, propyl, butyl, pentyl, hexyl, and isomeric forms thereof. The term "lower-alkoxy" includes methoxy, ethoxy, propoxy, butoxy, and isomeric forms thereof. The term "halophenyl" includes, for example, o-chlorophenyl, p-bromophenyl, 3,5-dichlorophenyl, m-iodophenyl, o-fluorophenyl, and the like. The term "aralkyl" includes, for example benzyl, α-methylbenzyl, phenethyl, 3-phenylpropyl, 4-phenylbutyl, 5-phenylpentyl, 6-phenylhexyl, and the like. And finally, the term "saturated heterocyclic amino radical

of from 5 to 7 nuclear atoms, inclusive," includes for example, pyrrolidino, 2-methylpyrrolidino, 2-ethylpyrrolidino, 2,2-dimethylpyrrolidino, 3,4-dimethylpyrrolidino, 2-isopropylpyrrolidino, 2 - sec.butylpyrrolidino, and like alkyl pyrrolidino groups, morpholino, 2-ethylmorpholino, 2-ethyl - 5 - methylmorpholino, 3,3 - dimethylmorpholino, thiamorpholino, 3-methylmorpholino, 2,3,6-trimethylmorpholino, 4-methylpiperazino, 4-butylpiperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethylenimino, 2-methylhexamethylenimino, 3,6-dimethylhexamethylenimino, homomorpholino, and the like.

The novel compounds of Formulas I, II, III, and IV including their acid addition salts and N-oxides are useful. They are pharmacologically active as inhibitors of pseudocholinesterase, and they can be used as central nervous system stimulants in mammals, birds, and other animals. More particularly, the compounds of this invention are useful for alleviating mental depression. Both the monoethers and diethers have been found to possess diuretic activity in addition to their usefulness as CNS stimulants. The cycloalkyenamine-p-benzoquinone adducts of Formula I are inherently useful as intermediates for preparing the (2-aminocycloalkyl)hydroquinone hydrogenolysis products of Formula II. Likewise, ethers of Formula III are useful as intermediates for preparing ethers of Formula IV.

The free base compounds of Formulas I, II, III, and IV can be reacted with fluosilicic acid to form fluosilicate salts in accordance with U.S. Patents 1,915,334 and 2,075,359. The amine fluosilicate salts thus obtained are effective as mothproofing agents. The same free base compounds also form salts with thiocyanic acid, which salts can be condensed with formaldehyde in accordance with U.S. Patents 2,425,320 and 2,606,155 to form amine thiocyanate-formaldehyde condensation products for use as pickling inhibitors.

The novel cycloalkenamine-p-benzoquinone adducts of this invention (compounds of Formula I) are prepared by condensing p-benzoquinone with a cycloalkenamine of the formula:

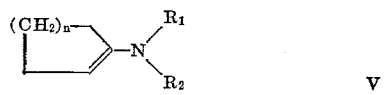

wherein $n$, $R_1$ and $R_2$ are as defined above, advantageously in the presence of an inert solvent and under substantially anhydrous conditions. It is preferred to employ about equimolar amounts of the reactants, although an excess of the cycloalkenamine can be employed if desired. The condensation reaction is exothermic, and the reaction mixture undergoes an initial evoltuion of heat. In some circumstances, depending somewhat upon quantities and concentration of reactants and rate of mixing, the temperature of the reaction mixture will reach the boiling temperature. After the initial reaction subsides, the reaction is conveniently completed at about 25° C. The reaction, however, can also be completed at temperatures higher than 25° C. if desired, such as up to about 80° C. or even higher. Ordinarily, satisfactory yields are obtained after about 15 hrs. to about 48 hrs. at about 25° C.; but if desired, longer reaction times can be employed. Since the reaction is sometimes vigorously exothermic, it is often preferred to mix the reactants at a temperature in the range of about 4° to 10° C. and then permit the reaction mixture to warm to about 25° C. for completion of the reaction. Suitable inert solvents for the reaction include benzene, ethyl acetate, toluene, hexane, ether, tetrahydrofuran, dioxane, chloroform, carbon tetrachloride, acetonitrile, and the like.

The cycloalkenamine-p-benzoquinone adducts usually separate from the reaction mixture as solids and are recovered by filtration. The product can be further purified by conventional methods such as washing, and recrystallization from suitable solvents.

The novel (2-aminocycloalkyl)hydroquinones of this invention (compounds according to Formula II) are prepared by hydrogenolytically cleaving the cycloalkenamine-p-benzoquinone adducts of Formula I. In general (an exception is more fully described below), the hydrogenolysis is preferably effected in the presence of a hydrogenation catalyst, e.g., platinum, or palladium supported on carbon or alumina, according to conventional methods, illustratively, in a system comprising (1) hydrogen gas under about 15 lbs. to about 50 to 60 lbs. pressure, (2) the catalyst, (3) temperatures in the range of about 10° C. to about 100° C. (preferably about 25° C.), and (4) a solvent. Representative solvents include glacial acetic acid, methanol, ethanol, ethyl acetate, and the like.

In general, the hydrogenolysis reaction proceeds readily and is essentially completed in about 1 hr. to about 1½ hrs. when, for example, platinum catalyst, hydrogen pressures of about 20 to 50 lbs., and a temperature of about 25° C. are employed. The (2-aminocycloalkyl)hydroquinone product is recovered by removing the catalyst from the reaction mixture, removing the solvent, and crystallizing. Advantageously, the product is recovered in the form of its free base, and purified by recrystallization from suitable solvents such as ether, technical hexane, ethyl acetate, ethanol, and the like.

Alternatively, hydrogenolysis of the alkenamine-p-benzoquinone adducts of Formula I can be effected with lithium aluminum hydride. Accordingly, an adduct of Formula I is reacted with lithium aluminum hydride in the presence of an inert organic solvent. Advantageously, the reaction mixture is heated, conveniently, at the reflux temperature of the reaction mixture. Suitable inert organic solvents include tetrahydrofuran, dioxane, dibutyl ether, diisopropyl ether, N-ethyl-morpholine, and the like. When the reaction is completed, the reaction mixture is decomposed, e.g., by careful addition of an aqueous acid (e.g., dilute hydrochloric acid), followed by a solubilizing agent (e.g., sodium potassium tartrate).

The mixture is then extracted with a water-immiscible solvent such as chloroform, methylene chloride, diethyl ether, and the like, and the solvent is removed by evaporation to obtain the desired (2-aminocycloalkyl)hydroquinone of Formula II. The compound can be purified by conventional means such as recrystallization.

According to the exception noted above, the (2-aminocycloalkyl)hydroquinones of this invention having a benzyl or α-alkylbenzyl group on the amino nitrogen (compounds according to Formula II wherein $R_1$ or $R_2$ are benzyl or α-alkylbenzyl) are prepared by hydrogenolytically cleaving the corresponding cycloalkenamine-p-benzoquinone adducts using lithium aluminum hydride. Those skilled in the art will recognize that catalytic hydrogenolysis of such adducts will remove any benzyl groups.

The esters and ethers of Formulas III and IV are prepared from the phenols of Formulas I and II, respectively, using procedures conventional in the art for etherifying phenols and for converting phenols to their alkanoic acid esters. The esters are prepared by for example, (1) acid-catalyzed esterification of the phenol with an alkanoic acid, e.g., formic acid, acetic acid, propionic acid, butyric acid, isobutyric acid, valeric acid, caproic acid, and the like; (2) treatment of the phenol with an alkanoyl halide, e.g., acetyl chloride, acetyl bromide, propionyl chloride, butyryl chloride, isobutyryl chloride, valeryl chloride, caproyl chloride, and the like; and (3) treatment of the phenol with an alkanoic anhydride, e.g., acetic anhydride, acetic formic anhydride, propionic anhydride, butyric anhydride, isobutyric anhydride, valeric anhydride, caproic anhydride, and the like. Generally speaking, procedure (3) is somewhat preferred.

The ethers are prepared by, for example, first forming an alkali metal salt of the hydroxyl group or groups and then reacting the resulting phenolate (phenate) with an alkylating agent such as alkyl and benzyl halides, e.g., methyl iodide, ethyl iodide, isopropyl bromide, butyl chloride, and benzyl chloride; alkyl sulfates, e.g., methyl and butyl sulfate; and alkyl sulfonates, e.g., methyl p-toluenesulfonate.

The cycloalkenamine starting compounds of Formula V are prepared by reacting cyclopentanone, cyclohexanone, or cycloheptanone with a secondary amine

wherein $R_1$ and $R_2$ are as defined above, according to the general method described by Stork et al., J. Amer. Chem. Soc. 85, 207–222 (1963), or the procedure of Blanchard, J. Org. Chem. 28, 1397–1398 (1963). Stork et al. describe the preparation of various cycloalkenamines by reacting one equivalent of cycloalkanone with 1.5 to 2 equivalents of a secondary amine in the presence of benzene or toluene. In some instances, p-toluenesulfonic acid is used as a catalyst. The reaction mixture is ordinarily heated at the reflux temperature using a water separator for from about 5 to about 24 hrs. or until water separation ceases. The cycloalkenamine product is recovered from the reaction mixture by distillation under reduced pressure. Enamines tend to be unstable, particularly in the presence of water. It is good practice to store them in the cold under nitrogen unless they are to be used soon after they are prepared.

Stork et al. describe 1-pyrrolidinocyclopentene, 1-morpholinocyclopentene, 1 - pyrrolidinocyclohexene, 1-morpholinocyclohexene, 1 - hexamethyleniminocyclohexene, 1-(N-methylanilino)cyclohexene, 1 - camphidinocyclohexene, and 1-morpholinocycloheptene. Following the same procedure, but utilizing other secondary amines, for example, diisopropylamine, di-n-hexylamine, N-tert. amyl-4-isopropylaniline, (3-phenylpropyl)ethylamine, N-butyl-2-chloroaniline, N-phenethyl-3-toluidine, N-ethyl-3,5 - xylidine, methyl(6 - phenylhexyl)amine, thiamorpholine, 1-methylpiperazine, phenethyl-n-hexylamine, N-isopropyl-N-(o-methoxyphenyl)amine, N - (4 - phenylbutyl)aniline, and ethylisobutylamine, and, for example, cyclopentanone there are prepared 1-diisopropylamino-cyclopentene, 1 - di - n - hexylaminocyclopentene, 1-(N-tert.amyl-4-isopropylanilino)cyclopentene, 1-[(3-phenylpropyl)ethylamino]cyclopentene, 1 - (N-butyl-2-chloroanilino)cyclopentene, 1 - (N-phenethyl-3-toluidino)cyclopentene, 1-(N-ethyl-3,5-xylidino)cyclopentene, 1-[methyl(6-phenylhexyl)amino]cyclopentene, 1-thiamorpholinocyclopentene, 1 - (4 - methylpiperazino)cyclopentene, 1-(phenethyl-n-hexylamino)cyclopentene, 1 - [N-isopropyl-N-(o-methoxyphenyl)amino]cyclopentene, 1-[N-4-(4-phenylbutyl)anilino]cyclopentene, and 1 - (ethylisobutylamino)cyclopentene, respectively. Preferably, enamines from low-boiling secondary amines are prepared by the procedure of Blanchard, supra. For example, dimethylamine and diethylamine react with cyclopentanone in ether at room temperature in the presence of anhydrous calcium chloride to give 1-dimethylaminocyclopentene and 1-diethylaminocyclopentene, respectively. By substituting cyclohexanone and cycloheptanone for cyclopentanone, the corresponding 1-(substituted-amino)cyclohexenes and 1-(substituted-amino)cycloheptenes are obtained.

The acid addition salts of this invention are obtained by neutralizing the free base compounds of Formulas I, II, III, and IV with an acid by conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids such as sulfuric, hydrochloric, hydrobromic, nitric, phosphoric, benzoic, p-toluenesulfonic, salicylic, acetic, propionic, pamoic tartaric, citric, succinic acids, and the like. Similarly, acid addition salts can be prepared with acids such as fluosilicic acid, thiocyanic acid, and the like.

The novel N-oxides of the invention can be prepared by reacting a free base compound of Formula I, II, III, or IV with a peroxidizing agent, for example, hydrogen peroxide, perbenzoic acid, perphthalic acid, peracetic acid, persulfuric acid, and permonosulfuric acid (Caro's acid). The reaction is advantageously carried out in a solvent, illustratively, glacial acetic acid, aqueous acetic acid, ethanol, and aqueous ethanol. The reaction proceeds satisfactorily at about 70° C.; however, higher or lower temperatures can be used. The N-oxides are separated from the reaction mixture and recovered in pure form by conventional procedures such as filtration, solvent evaporation, solvent extraction, and crystallization.

The following examples are illustrative of the process and products of the present invention, but are not to be construed as limiting.

EXAMPLE 1

Preparation of (2-piperidinocyclopentyl)hydroquinone and the diacetate thereof

PART A.—2,3,3a,8b-TETRAHYDRO-3a-PIPERIDINO-1H-CYCLOPENTA[b]BENZOFURAN-7-OL

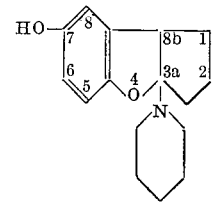

A solution consisting of 21.5 g. (0.2 mole) of p-benzoquinone and 30.5 g. (0.2 mole) of 1-piperidinocyclopentene in 400 ml. of benzene was allowed to react at about 25° C. for 3 days. The reaction mixture was filtered, and the brown solid that had separated was recovered on the filter. The filter cake was washed with technical hexane (Skellysolve B, a mixture of isomeric hexanes having a boiling range of 140° to 160° F.) and recrystallized from ethyl acetate. The 2,3,3a,8b-tetrahydro-3a-piperidino - 1H - cyclopenta[b]benzofuran-7-ol thus obtained as a tan solid had a M.P. of 178° to 183° C.; weight, 25 g. An analytical sample was obtained by recrystallization from ethyl acetate (decolorizing charcoal treatment). The pale yellow solid had a melting point of 184° to 185° C.

Analysis.—Calcd. for $C_{16}H_{21}NO_2$: C, 74.10; H, 8.16; N, 5.40. Found: C, 73.97; H, 8.26; N, 5.33.

PART B.—(2-PIPERIDINOCYCLOPENTYL) HYDROQUINONE

A mixture consisting of 10 g. of 2,3,3a,8b-tetrahydro-3a-piperidino-1H-cyclopenta[b]benzofuran-7-ol (Part A, above), 0.6 g. of platinum oxide, and 150 ml. of glacial acetic acid was hydrogenated at an initial pressure of about 35 lbs. for 1½ hrs. in a Parr hydrogenator. After the pressure had decreased to about 23 lbs. the hydrogenolysis was terminated. The reaction mixture was filtered to remove the catalyst and the acetic acid was removed under reduced pressure. The residue thus obtained was basified with aqueous sodium bicarbonate solution and the solid which separated was recovered on a filter. The filter cake was washed with water and air-dried for about 1 hr. Recrystallization from ethanol yielded 6.6 g. of (2-piperidinocyclopentyl)hydroquinone as a solid having a M.P. of 188° to 193° C. Two recrystallizations from ethyl acetate yielded product melting at 191° to 193° C. (dec.).

*Analysis.*—Calcd. for $C_{16}H_{23}NO_2$: C, 73.53; H, 8.87; N, 5.30. Found: C, 73.40; H, 9.10; N, 5.13.

PART C.—(2-PIPERIDINOCYCLOPENTYL)HYDROQUINONE DIACETATE

A solution consisting of 2 g. of (2-piperidinocyclopentyl)hydroquinone (Part B, above) in 30 ml. of acetic anhydride was heated at the reflux temperature for 1 hr., and the reaction mixture was poured into ice-water. After standing for several hours, the aqueous mixture was basified with aqueous sodium carbonate solution and extracted with methylene chloride. The organic layer was separated, washed with water, dried, and concentrated under reduced pressure. The white solid thus obtained was crystallized two times from a mixture of ether and technical hexane to give 2.0 g. of (2-piperidinocyclopentyl)hydroquinone diacetate having a M.P. of 104° to 105° C.

*Analysis.*—Calcd. for $C_{20}H_{27}NO_4$: C, 69.54; H, 7.88; N, 4.06. Found: C, 69.21; H, 8.05; N, 3.82.

Following the same procedure, but substituting propionic anhydride, butyric anhydride, valeric anhydride, acetic formic anhydride, and caproic anhydride for acetic anhydride, there were prepared (2-piperidinocyclopentyl) hydroquinone dipropionate, (2-piperidinocyclopentyl)hydroquinone dibutyrate, (2-piperidinocyclopentyl)hydroquinone divalerate, (2-piperidinocyclopentyl)hydroquinone diformate, and (2-piperidinocyclopentyl)hydroquinone dicaproate, respectively.

EXAMPLE 2

*Preparation of (2 - piperidinocyclohexyl)hydroquinone and the monomethyl and dimethyl ethers thereof*

PART A.—5a,6,7,8,9,9a-HEXAHYDRO-5a-PIPERIDINO-2-DIBENZOFURANOL

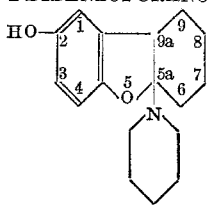

A solution consisting of 21.5 g. (0.2 mole) of p-benzoquinone and 33 g. (0.2 mole) of 1-piperidinocyclohexene in 400 ml. of benzene was allowed to react at about 25° C. for 2 days. The solid which separated was recovered on a filter and recrystallized from a mixture of ethyl acetate and technical hexane to give 27.1 g. of 5a,6,7,8,9,9a - hexahydro-5a-piperidino-2-dibenzofuranol having a melting point of 149° to 153° C.

Recrystallization from ethyl acetate gave the product as a tan solid melting at 152° to 154° C.

*Analysis.*—Calcd. for $C_{17}H_{23}NO_2$: C, 74.69; H, 8.48; N, 5.12. Found: C, 74.68; H, 8.57; N, 5.19.

The acetate of 5a,6,7,8,9,9a-hexahydro-5a-piperidino-2-dibenzofuranol was prepared according to the procedure of Example 1, Part C by substituting 5a,6,7,8,9,9a-hexahydro-5a-piperidino-2-dibenzofuranol for (2-piperidinocyclopentyl)hydroquinone.

PART B.—(2-PIPERIDINOCYCLOHEXYL)HYDROQUINONE

A mixture consisting of 10 g. of 5a,6,7,8,9,9a-hexahydro-5a-piperidino-2-dibenzofuranol (Part A, above), 1.0 g. of platinum oxide, and 150 ml. of glacial acetic acid was hydrogenated in a Parr hydrogenator at 25 to 35 lbs. pressure for 1½ hrs. The reaction mixture was filtered to remove catalyst and the acetic acid was removed under reduced pressure. The residue thus obtained was basified with aqueous sodium bicarbonate solution, and the solid which separated was recovered on a filter. The filter cake was washed with water and air-dried for about 1 hr. Recrystallization from ethyl acetate gave 5.4 g. of (2-piperidinocyclohexyl)hydroquinone having a M.P. of 188° to 192° C. Three more recrystallizations from ethyl acetate did not change the melting point.

*Analysis.*—Calcd. for $C_{17}H_{25}NO_2$: C, 74.14; H, 9.15; N, 5.09. Found: C, 74.15; H, 8.93; N, 4.98.

PART C.—LITHIUM ALUMINUM HYDRIDE HYDROGENOLYSIS OF 5a,6,7,8,9,9a - HEXAHYDRO - 5a - PIPERIDINO - 2 - DIBENZOFURANOL TO FORM (2-PIPERIDINOCYCLOHEXYL)HYDROQUINONE

To a stirred suspension of 5.0 g. of lithium aluminum hydride in 300 ml. of tetrahydrofuran at about 25° C. was added in small portions 2.75 g. (0.01 mole) of solid 5a,6,7,8,9,9a - hexahydro-5a-piperidino-2-dibenzofuranol. The reaction mixture was then sitrred for 3 hours at reflux. The flask was cooled in an ice-bath and excess lithium aluminum hydride was decomposed by adding dropwise ethyl acetate and then 3 N hydrochloric acid. Tetrahydrofuran was removed under reduced pressure, and an aqueous solution of sodium potassium tartrate was added. The mixture was extracted with chlorofrom and the organic layer washed in succession with water and saturated sodium chloride solution and dried over sodium sulfate. The solvent was removed under reduced pressure and the residue was recrystallized from ethyl acetate. There was thus obtained (2-piperidinocyclohexyl) hydroquinone identical with the compound prepared in Part B, above.

PART D.—METHYL ETHER OF 5a,6,7,8,9,9a-HEXAHYDRO-5a-PIPERIDINO-2-DIBENZOFURANOL

A mixture consisting of 27 g. (0.099 mole) 5a,6,7,8,9,9a-hexahydro - 5a - piperidino-2-dibenzofuranol (Part A, above), 4.5 g. of a 53.3% mineral oil dispersion of sodium hydride (0.10 mole) and 100 ml. dimethylformamide was stirred for about 1 hr. at 25° C. The mixture was then cooled to 0° to 10° C. and a solution of 18.6 g. (0.10 mole) methyl p-toluenesulfonate in 25 ml. dimethylformamide was added with stirring during an interval of 30 min. After the addition was completed the reaction mixture was stirred for 1½ hrs. at 0° to 10° C., and was then set aside at 25° C. The reaction mixture was then poured into 3 l. water and a solid separated. After pouring off the liquid, the solid was dissolved in methylene chloride. The methylene chloride solution was washed with water, washed with saturated aqueous sodium chloride solution, and dried over anhydrous magnesium sulfate. The methylene chloride was then removed by evaporation. The dark brown oil thus obtained was adsorbed on a 1 kg. column of magnesium silicate (Florisil) and elution effected with 2 l. technical hexane, 4 l. of a 10% mixture of acetone and technical hexane (fractions 1 through 10), 2 l. of a 20% mixture of acetone and technical hexane (fractions 11 through 14), and 4 l. of a 30% mixture of acetone and technical hexane (fractions 15 through 22). Fractions 9 through 12 were combined and the solvents were removed by evaporation to give 16.0 g. of the methyl ether of 5a,6,7,8,9,9a-hexahydro-5a-piperidino-2-dibenzofuranol as a yellow gum.

PART E.—4-METHOXY-2-(2-PIPERIDINOCYCLOHEXYL)PHENOL

The 16 g. of the methyl ether of 5a,6,7,8,9,9a-hexahydro-5a-piperidino-2-dibenzofuranol (Part D above) was dissolved in 250 ml. glacial acetic acid and hydrogenated at hydrogen pressures of 30 to 50 p.s.i. for about 1 hr. in the presence of 1.0 g. platinum oxide. The catalyst was removed by filtration, and the filtrate was concentrated by removing the acetic acid by evaporation under reduced pressure. The concentrate thus obtained was made alkaline with saturated aqueous sodium bicarbonate. The alkaline solution was extracted with ether. The ether extract was washed with water, washed with saturated aqueous sodium chloride, and dried over anhydrous magnesium sulfate. After removing the ether by evaporation, the yellowish solid thus obtained was recrystallized from technical hexane to give 4-methoxy-2-(2-piperidinocyclohexyl)phenol as a white solid melting at 90° to 92° C. An analytical sample was prepared by a second recrystallization from technical hexane; the melting point was 91° to 92° C.

Analysis.—Calcd. for $C_{18}H_{27}NO_2$: C, 74.70; H, 9.40; N, 4.84. Found: C, 74.58; H, 9.62; N, 4.85.

PART F.—1-[2-(2,5-DIMETHOXYPHENYL)CYCLO-HEXYL]PIPERIDINE HYDROCHLORIDE

A mixture consisting of 12.5 g. (0.0454 mole) (2-piperidinocyclohexyl)hydroquinone (prepared as in Part B, above) and 200 ml. dry dimethylformamide was cooled to 5° to 10° C. and 4.2 g. of a 53.3% mineral oil dispersion of sodium hydride (0.093 mole) was added with stirring. After thorough mixing, the cooling bath was removed and the mixture was stirred for 1 hr. as it warmed to 25° C. The mixture was cooled to 0° to 10° C. and a solution of 14.2 g. (0.10 mole) methyl iodide in 10 ml. dimethylformamide was added with stirring during an interval of 10 min. The reaction mixture was allowed to warm to 25° C. and stirring was continued for about 20 hrs. The brown reaction mixture was then poured into 2 l. water, and the aqueous mixture was extracted with methylene chloride. The methylene chloride extract was washed with saturated aqueous sodium chloride and dried over anhydrous magnesium sulfate. The washed and dried methylene chloride solution was concentrated by evaporating the methylene chloride. The residual oil thus obtained was dissolved in ether and the ether solution was washed with water several times, washed with saturated aqueous sodium chloride, and dried over anhydrous magnesium sulfate. After removing the ether by evaporation, the brown oil thus obtained gave a yellowish solid after treatment with ethereal hydrogen chloride. The 1-[2-(2,5-dimethoxyphenyl)cyclohexyl]piperidine hydrochloride thus obtained was recrystallized two times from a mixture of isopropyl alcohol and ether to give 8.75 g. of the compound as a white solid melting at 225.5° to 226.5° C. An analytical sample was prepared by a third recrystallization from the isopropyl alcohol-ether mixture; it had a melting point of 225° to 226° C.

Analysis.—Calcd. for $C_{19}H_{29}NO_2 \cdot HCl$: C, 67.13; H, 8.90; N, 4.12; Cl, 10.43. Found: C, 67.08; H, 8.64; N, 3.77; Cl, 10.33.

Following the same procedure but substituting ethyl iodide, propyl iodide, isobutyl iodide, isopentyl iodide, hexyl iodide, and benzyl chloride for methyl iodide, there were prepared the corresponding 1-[2-(2,5-diethoxyphenyl)cyclohexyl]piperidine hydrochloride, 1-[2-(2,5-dipropoxyphenyl)cyclohexyl]piperidine hydrochloride, 1-[2-(2,5-diisobutoxyphenyl)cyclohexyl]piperidine hydrochloride, 1-[2-(2,5-diisopentyloxyphenyl)cyclohexyl]piperidine hydrochloride, 1-[2-(2,5-dihexyloxyphenyl)cyclohexyl]piperidine hydrochloride, and 1-[2-(2,5-dibenzyloxyphenyl)cyclohexyl]piperidine hydrochloride.

EXAMPLE 3

Preparation of [2-(4-methyl-1-piperazinyl)cycloheptyl]hydroquinone

PART A.—6,7,8,9,10,10a-HEXAHYDRO-5a-(4-METHYL-1-PIPERAZINYL) - 5aH-CYCLOHEPTA[b]BENZOFURAN-2-OL

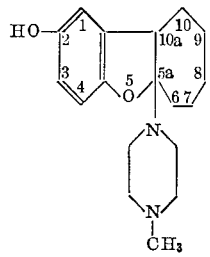

A solution consisting of 16.5 g. (0.153 mole) of p-benzoquinone and 30 g. (0.155 mole) of 1-(4-methyl-1-piperazinyl)cycloheptene in 300 ml. of benzene was allowed to react at about 25° C. for 3 days. The tan solid which separated was recovered on a filter and washed with technical hexane. There was thus obtained 47.5 g. of 6,7,8,9,10,10a - hexahydro - 5a - (4 - methyl - 1 - piperazinyl)-5aH-cyclohepta[b]benzofuran-2-ol having a melting point of 192° to 194° C. Two recrystallizations from ethanol gave the product having a melting point of 198° to 199° C.

Analysis.—Calcd. for $C_{18}H_{26}N_2O$: C, 71.49; H, 8.67; N, 9.26. Found: C, 71.67; H, 8.78; N, 9.21.

PART B.—[2-(4-METHYL-1-PIPERAZINYL)CYCLO-HEPTYL]HYDROQUINONE

A mixture consisting of 7.0 g. of 6,7,8,9,10,10a-hexahydro - 5a - (4-methyl-1-piperazinyl)-5aH-cyclohepta[b]benzofuran-2-ol (Part A, above), 1.0 g. of platinum oxide, and 150 ml. of glacial acetic acid was hydrogenated in a Parr hydrogenator for 1 hr., during which the theoretical amount of hydrogen was absorbed. The reaction mixture was filtered to remove the catalyst, and the acetic acid was removed by evaporation under reduced pressure. The residue thus obtained was basified with 5% aqueous sodium carbonate solution. The solid which separated was recovered on a filter, and the filter cake was washed with water and air-dried. Recrystallization from ethanol gave 4.6 g. of [2 - (4 - methyl - 1 - piperazinyl)cycloheptyl]hydroquinone having a melting point of 203° C. Two more recrystallizations from ethanol gave the product as a pinkish solid having a melting point of 203° to 204° C.

Analysis.—Calcd. for $C_{18}H_{28}N_2O_2$: C, 71.01; H, 9.27; N, 9.20. Found: C, 70.87; H, 9.14; N, 9.16.

EXAMPLE 4

Preparation of (2-morpholinocyclopentyl)hydroquinone

PART A.—2,3,3a,8b-TETRAHYDRO-3a-MORPHOLINO-1H-CYCLOPENTA[b]-BENZOFURAN-7-OL

A mixture consisting of 5.4 g. (0.05 mole) of p-benzoqinone in 75 ml. of benzene was treated with a solution of 7.65 g. (0.05 mole) of 1-morpholinocyclopentene in 25 ml. of benzene. The initial reaction was vigorous and in about ½ hr. solid material began to separate. After allowing the reaction mixture to stand for about 20 hrs. at 25° C., the brown solid that had formed was recovered on a filter. The filter cake was recrystallized from benzene to give 7.6 g. of 2,3,3a,8b-tetrahydro-3a-morpholino-1H-cyclopenta[b]benzofuran-7-ol having a melting point of 195° to 202° C. (with sintering at 170° C.). Recrystallization from ethyl acetate gave the product having a melting point of 210° to 211° C.

Analysis.—Calcd. for $C_{15}H_{19}NO_3$: C, 68.94; H, 7.33; N, 5.36. Found: C, 68.78; H, 7.17; N, 5.33.

PART B.—(2-MORPHOLINOCYCLOPENTYL)HYDROQUINONE

Following the procedure of Example 3, Part B, but substituting 2,3,3a,8b - tetrahydro - 3a - morpholino-1H-cyclopenta[b]benzofuran-7-ol for 6,7,8,9,10,10a-hexahydro-5a-(4-methyl-1-piperazinyl) - 5aH - cyclohepta[b]-benzofuran-2-ol, there was obtained (2-morpholinocyclopentyl)hydroquinone.

EXAMPLE 5

Preparation of (2-morpholinocyclohexyl)hydroquinone

PART A.—5a,6,7,8,9,9a-HEXAHYDRO-5a-MORPHOLINO-2-DIBENZOFURANOL

A solution consisting of 5.4 g. (0.05 mole) of p-benzoquinone and 8.5 g. (0.05 mole) of 1-morpholinocyclohexen in 100 ml. of ethyl acetate was allowed to react at about 25° C. for 16 hrs. The reaction mixture was diluted with technical hexane and a black tar separated. The liquid phase was decanted and concentrated under reduced pressure. The residue thus obtained was recrystallized from ethyl acetate to give 6.0 g. of 5a,6,7,8,9,9a-hexahydro-5a-morpholino-2-dibenzofuranol having a melting point of 151° to 152° C. After recrystallizing three more times from ethyl acetate the product was obtained as a tan solid having a melting point of 152° to 153° C.

*Analysis.*—Calcd, for $C_{16}H_{21}NO_3$: C, 69.79; H, 7.67; N, 5.09. Found: C, 69.67; H, 7.80; N, 5.29.

PART B.—(2-MORPHOLINOCYCLOHEXYL) HYDROQUINONE

Following the procedure of Example 2, Part B, but substituting 5a,6,7,8,9,9a - hexahydro - 5a-morpholino-2-dibenzofuranol for 5a,6,7,8,9,9a-hexahydro-5a-piperidino-2-dibenzofuranol, there was obtained (2-morpholinocyclohexyl)hydroquinone.

EXAMPLE 6

*Preparation of (2-piperidinocycloheptyl)hydroquinone*

PART A.—6,7,8,9,10,10a-HEXAHYDRO-5a-PIPERIDINO-5aH-CYCLOHEPTA[b]BENZOFURAN-2-OL

A solution consisting of 17 g. (0.157 mole) of p-benzoquinone and 28.5 g. (0.159 mole) of 1-piperidinocycloheptene in 300 ml. of benzene was allowed to react at about 25° C. for 2 days. The solid which separated was recovered on a filter, washed with technical hexane, and recrystallized from ethyl acetate to give 33 g. of 6,7,8,9,10,10a-hexahydro - 5a - piperidino - 5aH - cyclohepta[b]benzofuran-2-ol having a melting point of 160° to 163° C.

*Analysis.*—Calcd. for $C_{18}H_{25}NO_2$: C, 75.22; H, 8.77; N, 4.87. Found: C, 75.16; H, 8.84; N, 4.94.

PART B.—(2-PIPERIDINOCYCLOHEPTYL) HYDROQUINONE

Following the procedure of Example 3, Part B, but substituting 6,7,8,9,10,10a - hexahydro - 5a-piperidino-5aH-cyclohepta[b]benzofuran-2-ol for 6,7,8,9,10,10a-hexahydro - 5a - (4 - methyl-1-piperazinyl)-5aH-cyclohepta[b]-benzofuran-2-ol, there was obtained (2-piperidinocycloheptyl)hydroquinone.

EXAMPLE 7

*Preparation of [2-(4-methyl-1-piperazinyl)-cyclohexyl]hydroquinone*

PART A.—5a,6,7,8,9,9a-HEXAHYDRO-5a-(4-METHYL-1-PIPERAZINYL)-2-DIBENZOFURANOL

A solution consisting of 21.5 g. (0.2 mole) of p-benzoquinone in 300 ml. of benzene was mixed with a solution of 36 g. (0.2 mole) of 1-(4-methyl-1-piperazinyl)cyclohexene in about 100 ml. of benzene. After an interval of no apparent reaction, an exothermic reaction initiated and the temperature of the reaction mixture increased. A solid separated from solution. The reaction mixture was set aside for 20 hrs. at about 25° C., and the solids (brown) were collected on a filter and washed with benzene. There was thus obtained 52 g. (90% yield) of 5a,6,7,8,9,9a - hexahydro - 5a-(4-methyl-1-piperazinyl)-2-dibenzofuranol having a melting point of 155° to 160° C. After recrystallizing two times from ethyl acetate and once from absolute ethanol the melting point was 160° to 161° C.

*Analysis.*—Calcd. for $C_{17}H_{24}N_2O_2$: C, 70.80; H, 8.39; N, 9.71. Found: C, 71.02; H, 8.64; N, 9.56.

PART B.—[2-(4-METHYL-1-PIPERAZINYL) CYCLOHEXYL]HYDROQUINONE

Following the procedure of Example 3, Part B, but substituting 5a,6,7,8,9,9a-hexahydro - 5a - (4-methyl-1-piperazinyl)-2-dibenzofuranol for 6,7,8,9,10,10a-hexahydro-5a-(4-methyl-1-piperazinyl) - 5aH - cyclohepta[b]benzofuran-2-ol, there was prepared [2-(4-methyl-1-piperazinyl) cyclohexyl]hydroquinone.

EXAMPLE 8

*Preparation of (2-morpholinocycloheptyl)hydroquinone*

PART A.—6,7,8,9,10,10a-HEXAHYDRO-5a-MORPHOLINO-5aH-CYCLOHEPTA[b]BENZOFURAN-2-OL

A solution of 21.5 g. (0.20 mole) of p-benzoquinone in 300 ml. of benzene was mixed with a solution of 36.5 g. (0.20 mole) of 1-morpholinocycloheptene in 100 ml. of benzene. An exothermic reaction initiated and the temperature of the reaction mixture increased. A solid began to separate from solution within a few minutes. The reaction mixture was set aside for 20 hrs., and the solids were then recovered on a filter. The filter cake was triturated with hot ethyl acetate and then recrystallized from n-butanol. There was thus obtained 47 g. (81% yield) of 6,7,8,9,10,10a - hexahydro - 5a - morpholino - 5aH - cyclohepta[b]benzofuran - 2 - ol having a melting point of 218° to 221° C. After another recrystallization from n-butanol the compound as a white solid had a melting point of 217° to 220° C.

*Analysis.*—Calcd. for $C_{17}H_{23}NO_3$: C, 70.56; H, 8.01; N, 4.64. Found: C, 70.99; H, 8.13; N, 4.61.

PART B.—(2-MORPHOLINOCYCLOHEPTYL) HYDROQUINONE

Following the procedure of Example 2, Part B, but substituting 6,7,8,9,10,10a-hexahydro - 5a - morpholino-5aH-cyclohepta[b]-benzofuran-2-ol for 5a,6,7,8,9,9a-hexahydro-5a-piperidino-2-dibenzofuranol, there was prepared 2-morpholinocycloheptyl) hydroquinone.

EXAMPLE 9

*Preparation of (2-piperidinocyclohexyl)hydroquinone N-oxide*

A solution of 5.5 g. (0.02 mole) of (2-piperidinocyclohexyl)-hydroquinone in 100 ml. of methanol was cooled in an ice-water bath and 6.9 g. (0.04 mole) of m-chloroperbenzoic acid was added slowly during an interval of about 2 min. The reaction mixture was kept at about 10° C. for 5 hrs., and then warmed and kept at about 25° C. for about 15 hrs. After removing the methonal under reduced pressure, about 70 ml. of water was added. The aqueous mixture was basified with aqueous sodium hydroxide solution. The basified mixture was repeatedly extracted with methylene chloride, and the extracts were combined. The methylene chloride solution was washed with water, washed with saturated aqueous sodium chloride solution, and dried over anhydrous sodium sulfate. The methylene chloride was removed by evaporation to obtain (2-piperidinocyclohexyl)hydroquinone N-oxide.

EXAMPLE 10

Following the procedure of Example 1, Part A, but replacing 1-piperidinocyclopentene with 1-pyrrolidinocyclopentene,
1-pyrrolidinocyclohexene,
1-hexamethyleniminocyclohexene,
1-(N-methylanilino)cyclohexene,
1-dimethylaminocyclopentene,
1-diisopropylaminocyclopentene,
1-di-n-hexylaminocyclopentene,
1-(N-tert.amyl-4-isopropylanilino)cyclopentene,
1-[(3-phenylpropyl)-ethylamino]cyclopentene,
1-(N-butyl-2-chloroanilino)cyclopentene,
1-(N-phenethyl-3-toluidino)cyclopentene,
1-(N-ethyl-3,5-xylidino)-cyclopentene,
1-[methyl(6-phenylhexyl)amino]cycloheptene,
1-thiamorpholinocyclopentene,
1-(phenethyl-n-hexylamino)cyclopentene,
1-[N-isopropyl-N-(o-methoxyphenyl)amino]cyclopentene,
1-[N-(4-phenylbutyl)anilino]cyclopentene,
1-(ethylisobutylamino)-cyclopentene, and
1-diethylaminocyclopentene, there were prepared 2,3,3a,8b-tetrahydro-3a-pyrrolidino-1H-cyclopenta[b]
benzofuran-7-ol,
5a,6,7,8,9,9a-hexahydro-5a-pyrrolidino-2-dibenzofuranol,
5a,6,7,8,9,9a-hexahydro-5a-hexamethylenimino-2-dibenzofuranol,
5a,6,7,8,9,9a-hexahydro-5a-(N-methylanilino)-2-dibenzofuranol,
2,3,3a,8b-tetrahydro-3a-dimethylamino-1H-cyclopenta[b]benzofuran-7-ol,
2,3,3a,8b-tetrahydro-3a-diisopropylamino-1H-cyclopenta[b]benzofuran-7-ol,
2,3,3a,8b-tetrahydro-3a-di-n-hexylamino-1H-cyclopenta[b]benzofuran-7-ol,
2,3,3a,8b-tetrahydro-3a-(N-tert.amyl-4-isopropylanilino)-1H-cyclopenta[b]benzofuran-7-ol,
2,3,3a,8b-tetrahydro-3a-(3-phenylpropyl)ethylamino-1H-cyclopenta[b]benzofuran-7-ol,
2,3,3a,8b-tetrahydro-3a-(N-butyl-2-chloroanilino)-1H-cyclopenta[b]benzofuran-7-ol,
2,3,3a,8b-tetrahydro-3a-(N-phenethyl-3-toluidino)-1H-cyclopenta[b]benzofuran-7-ol,
2,3,3a,8b-tetrahydro-3a-(N-ethyl-3,5-xylindino)-1H-cyclopenta[b]benzofuran-7-ol,
2,3,3a,8b-tetrahydro-3a-[methyl-(6-phenylhexyl)amino]-1H-cyclopenta[b]benzofuran-7-ol,
2,3,3a,8b-tetrahydro-3a-thiamorpholino-1H-cyclopenta[b]benzofuran-7-ol,
2,3,3a,8b-tetrahydro-3a-(phenethyl-n-hexylamino)-1H-cyclopenta[b]benzofuran-7-ol,
2,3,3a,8b-tetrahydro-3a-[N-isopropyl-N-(o-methoxyphenyl)amino]-1H-cyclopenta[b]benzofuran-7-ol,
2,3,3a,8b-tetrahydro-3a-[N-(4-phenylbutyl)anilino]-1H-cyclopenta[b]benzofuran-7-ol,
2,3,3a,8b-tetrahydro-3a-ethylisobutylamino-1H-cyclopenta[b]benzofuran-7-ol, and
2,3,3a,8b-tetrahydro-3a-diethylamino-1H-cyclopenta[b]benzofuran-7-ol, respectively.

EXAMPLE 11

Following the procedure of Example 1, Part B, but substituting
2,3,3a,8b-tetrahydro-3a-pyrrolidino-1H-cyclopenta[b]benzofuran-7-ol,
5a,6,7,8,9,9a-hexahydro-5a-pyrrolidino-2-dibenzofuranol,
5a,6,7,8,9,9a-hexahydro-5a-hexamethylenimino-2-dibenzofuranol
5a,6,7,8,9,9a-hexahydro-5a-(N-methylanilino)-2-dibenzofuranol,
2,3,3a,8b-tetrahydro-3a-dimethylamino-1H-cyclopenta[b]benzofuran-7-ol,
2,3,3a,8b-tetrahydro-3a-diisopropylamino-1H-cyclopenta[b]benzofuran-7-ol.
2,3,3a,8b-tetrahydro-3a-di-n-hexylamino-1H-cyclopenta[b]benzofuran-7-ol,
2,3,3a,8b-tetrahydro-3a-(N-tert.amyl-4-isopropylanilino)-1H-cyclopenta[b]benzofuran-7-ol,
2,3,3a,8b-tetrahydro-3a-(3-phenylpropyl)ethylamino-1H-cyclopenta[b]benzofuran-7-ol,
2,3,3a,8b-tetrahydro-3a-(N-butyl-2-chloroanilino)-1H-cyclopenta[b]benzofuran-7-ol,
2,3,3a,8b-tetrahydro-3a-(N-phenethyl-3-toluidino)-1H-cyclopenta[b]benzofuran-7-ol,
2,3,3a,8b-tetrahydro-3a-(N-ethyl-3,5-xylidino)-1H-cyclopenta[b]benzofuran-7-ol,
2,3,3a,8b-tetrahydro-3a-[methyl-(6-phenylhexyl)amino]-1H-cyclopenta[b]benzofuran-7-ol,
2,3,3a,8b-tetrahydro-3a-thiamorpholino-1H-cyclopenta[b]benzofuran-7-ol,
2,3,3a,8b-tetrahydro-3a-(phenethyl-n-hexylamino)-1H-cyclopenta[b]benzofuran-7-ol,
2,3,3a,8b-tetrahydro-3a-[N-isopropyl-N-(o-methoxyphenyl)amino]-1H-cyclopenta[b]benzofuran-7-ol,
2,3,3a,8b-tetrahydro-3a-[N-(4-phenylbutyl)anilino]-1H-cyclopenta[b]benzofuran-7-ol,
2,3,3a,8b-tetrahydro-3a-ethylisobutylamino-1H-cyclopenta[b]benzofuran-7-ol, and
2,3,3a,8b-tetrahydro-3a-diethylamino-1H-cyclopenta[b]benzofuran-7-ol for
2,3,3a,8b-tetrahydro-3a-piperidino-1H-cyclopenta[b]benzofuran-7-ol, there were prepared (2-pyrrolidinocyclopentyl)hydroquinone,
(2-pyrrolidinocyclohexy)hydroquinone,
(2-hexamethyleniminocyclohexyl)hydroquinone,
[2-(N-methylanilino)cyclohexyl]hydroquinone,
(2-dimethylaminocyclopentyl)hydroquinone,
(2-diisopropylaminocyclopentyl)hydroquinone,
(2-di-n-hexylaminocyclopentyl)hydroquinone,
[2-(N-tert.amyl-4-isopropylanilino)cyclopentyl]hydroquinone,
[2-(3-phenylpropyl)ethylaminocyclopentyl]hydroquinone,
[2-(N-butyl-2-chloroanilino)cyclopentyl]hydroquinone,
[2-(N-phenethyl-3-toluidino)cyclopentyl]hydroquinone,
[2-(N-ethyl-3,5-xylidino)cyclopentyl]hydroquinone,
{2-[methyl(6-phenylhexyl)amino]cyclopentyl}hydroquinone,
(2-thiamorpholinocyclopentyl)hydroquinone,
[2-(phenethyl-n-hexylamino)cyclopentyl]hydroquinone,
{2-[N-isopropyl-N-(o-methoxyphenyl)amino]cyclopentyl}hydroquinone,
{2-[N-(4-phenylbutyl)anilino]cyclopentyl}hydroquinone,
(2-ethylisobutylaminocyclopentyl)hydroquinone, and
(2-diethylaminocyclopentyl)hydroquinone, respectively.

EXAMPLE 12

To an ethanolic solution of 2,3,3a,8b-tetrahydro-3a-morpholino-1H-cyclopenta[b]benzofuran-7-ol (Example 4, Part A) is added an ethanolic solution of 1 equivalent of hydrogen chloride. The mixture is evaporated to dryness below 30° C. to obtain 2,3,3a,8b-tetrahydro-3a-morpholino-1H-cyclopenta[b]benzofuran-7-ol hydrochloride.

Following the same procedure, but substituting (2-morpholinocyclopentyl)hydroquinone (Example 4, Part B) for 2,3,3a,8b - tetrahydro - 3a - morpholino - 1H - cyclopenta[b]benzofuran-7-ol, there is obtained (2-morpholinocyclopentyl)hydroquinone hydrochloride.

Following the same procedure, but substituting for hydrogen chloride other pharmacologically acceptable acids, e.g., those given above, there are obtained the sulfates, hydrobromides, nitrates, phosphates, benzoates, p-toluenesulfonates, salicylates, acetates, propionates, pamoates, tartrates, citrates, and succinates of 2,3,3a,8b-tetrahydro-3a-morpholino-1H-cyclopenta[b]benzofuran-7-ol and (2-morpholinocyclopentyl)hydroquinone.

Following the same procedure, but substituting for 2,3,3a,8b - tetrahydro - 3a - morpholino - 1H - cyclopenta[b]benzofuran-7-ol and (2-morpholinocyclopentyl)hydroquinone each of the free bases disclosed in Examples 1, 2, 3, 5, 6, 7, 8, 10 and 11, there are obtained the hydrochlorides, sulfates, hydrobromides, nitrates, phosphates, benzoates, p-toluenesulfonates, salicylates, acetates, propionates, pamoates, tartrates, citrates, and succinates of said bases.

EXAMPLE 13

Following the procedure of Example 2, Part D, but substituting
2,3,3a,8b-tetrahydro-3a-piperidino-1H-cyclopenta[b]benzofuran-7-ol,
6,7,8,9,10,10a-hexahydro-5a-(4-methyl-1-piperazinyl)-5aH-cyclohepta[b]benzofuran-2-ol,
2,3,3a,8b-tetrahydro-3a-morpholino-1H-cyclopenta[b]benzofuran-7-ol,
6,7,8,9,10,10a-hexahydro-5a-piperidino-5aH-cyclohepta[b]benzofuran-2-ol,
5a,6,7,8,9,9a-hexahydro-5a-(4-methyl-1-piperazinyl)-2-dibenzofuranol, 6,7,8,9,10,10a-hexahydro-5a-morpholino-5aH-cyclohepta[b]benzofuran-2-ol,
2,3,3a,8b-tertahydro-3a-pyrrolidino-1H-cyclopenta[b]benzofuran-7-ol,
5a,6,7,8,9,9a-hexahydro-5a-pyrrolidino-2-dibenzofuranol,
5a,6,7,8,9,9a-hexahydro-5a-hexamethylenimino-2-dibenzofuranol,
5a,6,7,8,9,9a-hexahydro-5a-(N-methylanilino)-2-dibenzofuranol,
2,3,3a,8b-tetrahydro-3a-dimethylamino-1H-cyclopenta[b]benzofuran-7-ol,
2,3,3a,8b-tetrahydro-3a-diisopropylamino-1H-cyclopenta[b]benzofuran-7-ol,
2,3,3a,8b-tetrahydro-3a-di-n-hexylamino-1H-cyclopenta[b]benzofuran-7-ol,
2,3,3a,8b-tetrahydro-3a-(N-tert.amyl-4-isopropylanilino)-1H-cyclopenta[b]benzofuran-7-ol,
2,3,3a,8b-tetrahydro-3a-(3-phenylpropyl)ethylamino-1H-cyclopenta[b]benzofuran-7-ol,
2,3,3a,8b-tetrahydro-3a-(N-butyl-2-chloroanilino)-1H-cyclopenta[b]benzofuran-7-ol,
2,3,3a,8b-tetrahydro-3a-(N-phenethyl-3-toluidino)-1H-cyclopenta[b]benzofuran-7-ol,
2,3,3a,8b-tetrahydro-3a-(N-ethyl-3,5-xylidino)-1H-cyclopenta[b]benzofuran-7-ol,
2,3,3a,8b-tetrahydro-3a-[methyl(6-phenylhexyl)amino]-1H-cyclopenta[b]benzofuran-7-ol,
2,3,3a,8b-tetrahydro-3a-thiamorpholino-1H-cyclopenta[b]benzofuran-7-ol,
2,3,3a,8b-tetrahydro-3a-(phenyethyl-n-hexylamino)-1H-cyclopenta[b]benzofuran-7-ol,
2,3,3a,8b-tetrahydro-3a-[N-isopropyl-N-(o-methoxyphenyl)amino]-1H-cyclopenta[b]benzofuran-7-ol,
2,3,3a,8b-tetrahydro-3a-[N-(4-phenylbutyl)anilino]-1H-cyclopenta[b]benzofuran-7-ol,
2,3,3a,8b-tetrahydro-3a-ethylisobutylamino-1H-cyclopenta[b]benzofuran-7-ol, and
2,3,3a,8b-tetrahydro-3a-diethylamino-1H-cyclopenta[b]benzofuran-7-ol,
there were prepared each corresponding methyl ether, respectively.

EXAMPLE 14

Following the procedure of Example 2, Part E, but substituting the methyl ethers prepared in Example 13, there were prepared the corresponding 4-methoxy-2-(2-piperidinocyclopentyl)-phenol,
4-methoxy-2-[2-(4-methyl-1-piperazinyl)cycloheptyl]-phenol,
4-methoxy-2-(2-morpholinocyclopentyl)phenol,
4-methoxy-2-(2-piperidinocycloheptyl)phenol,
4-methoxy-2-[2-(4-methyl-1-piperazinyl)cyclohexyl]phenol,
4-methoxy-2-(2-morpholinocycloheptyl)phenol,
4-methoxy-2-(2-pyrrolidinocyclopentyl)phenol,
4-methoxy-2-(2-pyrrolidinocyclohexyl)phenol,
4-methoxy-2-(2-hexamethyleniminocyclohexyl)phenol,
4-methoxy-2-[2-methylanilino)cyclohexyl]phenol,
4-methoxy-2-(2-dimethylaminocyclopentyl)phenol,
4-methoxy-2-(2-diisopropylaminocyclopentyl)phenol,
4-methoxy-2-(2-di-n-hexylaminocyclopentyl)phenol,
4-methoxy-2-[2-(N-tert.amyl-4-isopropylanilino)cyclopentyl]phenol,
4-methoxy-2-[2-(3-phenylpropyl)ethylaminocyclopentyl]phenol,
4-methoxy-2-[2-(N-butyl-2-chloroanilino)cyclopentyl]phenol,
4-methoxy-2-[2-(N-phenethyl-3-toluidino)cyclopentyl]phenol,
4-methoxy-2-[2-(N-ethyl-3,5-xylidino)cyclopentyl]phenol,
4-methoxy-2-{2-[methyl-(6-phenylhexyl)amino]cyclopentyl}phenol,
4-methoxy-2-(2-thiamorpholinocyclopentyl)phenol,
4-methoxy-2-[2-(phenethyl-n-hexylamino)cyclopentyl]phenol,
4-methoxy-2-{2-[N-isopropyl-N-(o-methoxyphenyl)amino]cyclopentyl}phenol,
4-methoxy-2-{2-[N-(phenylbutyl)anilino]cyclopentyl}phenol,
4-methoxy-2-(2-ethylisobutylaminocyclopentyl)phenol, and
4-methoxy-2-(2-diethylaminocyclopentyl)phenol.

EXAMPLE 15

Following the procedure of Example 2, Part F, but substituting (2-piperidinocyclopentyl)hydroquinone,
[2-(4-methyl-1-piperazinyl)cycloheptyl]hydroquinone,
(2-morpholinocyclopentyl)-hydroquinone,
(2-morpholinocyclohexyl)hydroquinone,
(2-piperidinocycloheptyl)hydroquinone,
[2-(4-methyl-1-piperazinyl)-cyclohexyl]hydroquinone,
(2-morpholinocycloheptyl)hydroquinone,
(2-pyrrolidinocyclopentyl)hydroquinone,
(2-pyrrolidinocyclohexyl)hydroquinone,
(2-hexamethyleniminocyclohexyl)hydroquinone,
[2-(N-methylanilino)cyclohexyl]hydroquinone,
(2-dimethylaminocyclopentyl)hydroquinone,
(2-diisopropylaminocyclopentyl)hydroquinone,
(2-di-n-hexylaminocyclopentyl)hydroquinone,
[2-(N-tert.amyl-4-isopropylanilino)cyclopentyl]hydroquinone,
[2-(3-phenylpropyl)-ethylaminocyclopentyl]hydroquinone,
[2-(N-butyl-2-chloroanilino)-cyclopentyl]hydroquinone,
[2-(N-phenethyl-3-toluidino)cyclopentyl]hydroquinone,
[2-(N-ethyl-3,5-xylidino)cyclopentyl]hydroquinone,
{2-[methyl(6-phenylhexyl)amino]cyclopentyl}hydroquinone,
(2-thiamorpholinocyclopentyl)hydroquinone,
[2-(phenethyl-n-hexylamino)cyclopentyl]hydroquinone,
{2-[N-isopropyl-N-(o-methoxyphenyl)amino]cyclopentyl}hydroquinone,
{2-[N-(4-phenylbutyl)anilino]cyclopentyl}hydroquinone,
(2-ethylisobutylaminocyclopentyl)hydroquinone, and
(2-diethylaminocyclopentyl)hydroquinone, there were prepared the corresponding 1-[2-(2,5-dimethoxyphenyl)cyclopentyl]piperidine hydrochloride,
1-[2-(2,5-dimethoxyphenyl)cyclopentyl]4-methylpiperazine hydrochloride,
4-[2-(2,5-dimethoxyphenyl)cyclopentyl]morpholine hydrochloride,
4-[2-(2,5-dimethoxyphenyl)cyclohexyl]morpholine hydrochloride,
1-[2-(2,5-dimethoxyphenyl)cycloheptyl]piperidine hydrochloride,
1-[2-(2,5-dimethoxyphenyl)cyclohexyl]4-methylpiperazine hydrochloride,
4-[2-(2,5-dimethoxyphenyl)cycloheptyl]morpholine hydrochloride,
1-[2-(2,5-dimethoxyphenyl)cyclopentyl]pyrrolidine hydrochloride,
1-[2-(2,5-dimethoxyphenyl)cyclohexyl]pyrrolidine hydrochloride,
1-[2-(2,5-dimethoxyphenyl)cyclohexyl]hexamethylenimine hydrochloride,
N-[2-(2,5-dimethoxyphenyl)cyclohexyl]-N-methylaniline hydrochloride,
N-[2-(2,5-dimethoxyphenyl)cyclopentyl]dimethylamine hydrochloride,
N-[2-(2,5-dimethoxyphenyl)-cyclopentyl]diisopropylamine hydrochloride,
N-[2-(2,5-dimethoxyphenyl)cyclopentyl]di-n-hexylamine hydrochloride, N-[2-(2,5-dimethoxyphenyl)cyclopentyl]N-(tert.amyl-4-isopropyl)aniline hydrochloride,
N-[2-(2,5-dimethoxyphenyl)cyclopentyl]-N-(3-phenylpropyl)ethylamine hydrochloride,
N-[2-(2,5-dimethoxyphenyl)cyclopentyl]-N-butyl-2-chloroaniline hydrochloride,
N-[2-(2,5-dimethoxyphenyl)cyclopentyl]-N-phenethyl-3-toluidine hydrochloride,
N-[2-(2,5-dimethoxyphenyl)cyclopentyl]-N-ethyl-3,5-xylidine hydrochloride,
N-[2-(2,5-dimethoxyphenyl)cyclopentyl]-N-methyl-(6-phenylhexyl)amine hydrochloride,
4-[2-(2,5-dimethoxyphenyl)cyclopentyl]thiamorpholine hydrochloride,
N-[2-(2,5-dimethoxyphenyl)cyclopentyl]-N-phenethyl-n-hexylamine hydrochloride,
N-[2-(2,5-dimethoxyphenyl)cyclopentyl]-N-(o-methoxyphenyl)isopropylamine hydrochloride,
N-[2-(2,5-dimethoxyphenyl)cyclopentyl]-N-(4-phenylbutyl)aniline hydrochloride,
N-[2-(2,5-dimethoxyphenyl)cyclopentyl]-N-ethylisobutylamine hydrochloride, and
N-[2-(2,5-dimethoxyphenyl)cyclopentyl]diethylamine hydrochloride, respectively.

I claim:
1. A compound selected from the group consisting of (1) free base compounds of the formula:

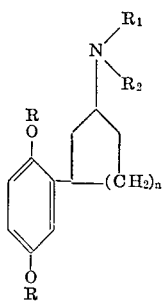

wherein the R's are the same and selected from the group consisting of hydrogen, lower-alkyl of from 1 to 6 carbon atoms, inclusive, benzyl, and lower-alkanoyl of from 1 to 6 carbon atoms, inclusive, except that the 5-OR group can be lower alkoxy when the 2-OR group is hydroxyl; $n$ is an integer from 1 to 3, inclusive; and $R_1$ and $R_2$ taken separately are selected from the group consisting of lower-alkyl, aralkyl of from 7 to 12 carbon atoms, inclusive, phenyl, and substituted phenyl selected from the group consisting of lower-alkylphenyl, lower-alkoxyphenyl, and halophenyl, provided that $R_1$ and $R_2$ are not simultaneously selected from phenyl and substituted phenyl, and taken together with —N< constitute a saturated heterocyclic amino radical

of from 5 to 7 nuclear atoms, inclusive, wherein Z is a saturated bivalent radical selected from the group consisting of alkylene, thiadialkylene, N-lower-alkylazadialkylene, and oxadialkylene; (2) acid addition salts and (3) N-oxides thereof.

2. (2-piperidinocycloalkyl)hydroquinone according to claim 1.

3. (2 - piperidinocyclopentyl)hydroquinone according to claim 2.

4. (2-piperidinocyclohexyl)hydroquinone according to claim 2.

5. 2-(piperidinocycloalkyl)hydroquinone dialkanoate according to claim 1.

6. (2-piperidinocyclopentyl)hydroquinone diacetate according to claim 5.

7. [2-(4-methyl-1-piperazinyl)cycloalkyl]hydroquinone according to claim 1.

8. [2 - (4 - methyl-1-piperazinyl)cycloheptyl]hydroquinone according to claim 7.

9. 1 - [2 - (2,5-di-lower-alkoxyphenyl)cycloalkyl]piperidine acid addition salt according to claim 1.

10. 1-[2-(2,5 - dimethoxyphenyl)cyclohexyl]piperidine hydrochloride according to claim 9.

11. 4 - lower - alkoxy-2-(2-piperidinocycloalkyl)phenol according to claim 1.

12. 4 - methoxy - 2 - (2 - piperidinocyclohexyl)phenol according to claim 11.

13. The process which comprises condensing p-benzoquinone with a cycloalkenamine of the formula:

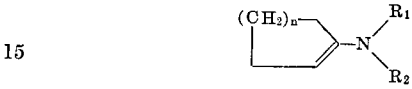

wherein $n$ is an integer from 1 to 3, inclusive, wherein $R_1$ and $R_2$ taken separately are selected from the group consisting of lower-alkyl, aralkyl of from 7 to 12 carbon atoms, inclusive, phenyl, and substituted phenyl selected from the group consisting of lower-alkylphenyl, lower-alkoxyphenyl, and halophenyl, provided that $R_1$ and $R_2$ are not simultaneously selected from phenyl and substituted phenyl, and wherein $R_1$ and $R_2$ taken together with —N< constitute a saturated heterocyclic amino radical

wherein Z is a saturated bivalent radical selected from the group consisting of alkylene, oxadialkylene, thiadialkylene, and N-lower-alkylazadialkylene, to produce a cycloalkenamine-p-benzoquinone adduct of the formula:

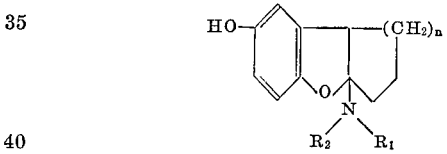

wherein $n$, $R_1$ and $R_2$ are as defined above, and hydrogenolytically cleaving the thus-produced cycloalkenamine-p-benzoquinone adduct to obtain a (2-aminocycloalkyl)hydroquinone product having the formula:

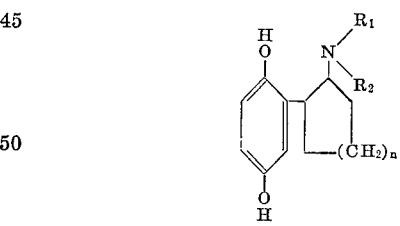

wherein $n$, $R_1$, and $R_2$ are as defined above.

14. The process according to claim 13, wherein the cycloalkenamine is a cycloalken-saturated-heterocyclic-amine.

15. The process which comprises hydrogenolytically cleaving a cycloalkenamine-p-benzoquinone adduct of the formula:

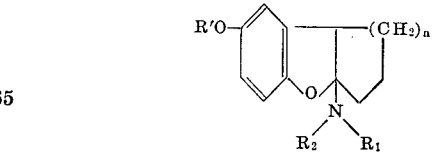

wherein R' is lower-alkyl of from 1 to 6 carbon atoms, inclusive, $n$ is an integer from 1 to 3, inclusive; and $R_1$ and $R_2$ taken separately are selected from the group consisting of lower-alkyl, aralkyl of from 7 to 12 carbon atoms, inclusive, phenyl, and substituted phenyl selected from the group consisting of lower-alkylphenyl, lower-alkoxyphenyl, and halophenyl, provided that $R_1$ and $R_2$ are not simultaneously selected from phenyl and substituted phenyl, and taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene to produce a (2-aminocycloalkyl)hydroquinone product having the formula:

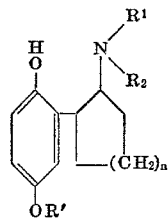

wherein R', $n$, $R_1$, and $R_2$ are as defined above.

16. Process according to claim 15, wherein cleaving is effected catalytically.

References Cited

UNITED STATES PATENTS

| 2,949,359 | 8/1960 | Blout et al. | 260—570.8 |
| 3,019,972 | 11/1961 | Kaisen et al. | 260—346.2 |
| 3,062,821 | 11/1962 | Archen | 260—268 |
| 3,184,457 | 5/1965 | Brannock | 260—247.7 |
| 3,291,798 | 12/1966 | Skaletzky | 260—268 |
| 3,294,810 | 12/1966 | Brossi et al. | 260—295 |
| 3,317,527 | 5/1967 | Skaletzky | 260—247.7 |
| 3,337,563 | 8/1967 | Skaletzky | 260—294.7 |

OTHER REFERENCES

Domschke: Chem. Abstr., vol. 60, col. 7973(g), (1964).

DONALD G. DAUS, Primary Examiner

U.S. Cl. X.R.

260—294.3, 294.7, 396, 563, 346.2, 376.81, 326.8, 247.7, 211, 244, 143, 239, 690, 570.8, 544, 546, 586, 577, 999

PO-1050
(5/69)

UNITED STATES PATENT OFFICE
CERTIFICATE OF CORRECTION

Patent No. 3,496,181  Dated February 17, 1970

Inventor(s) Louis L. Skaletzky

It is certified that error appears in the above-identified patent and that said Letters Patent are hereby corrected as shown below:

Column 17, lines 28-40, correct the formula to

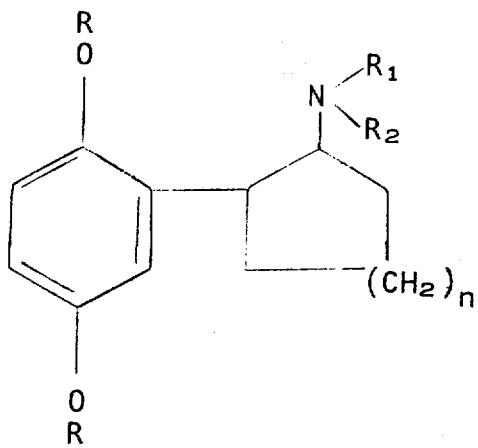

Column 12, line 66, correct "(6-phenylhexyl)amino]cycloheptene" to --(6-phenylhexyl)amino]cyclopentene--; Column 16, line 50, correct "dimethoxyphenyl)cyclopentyl]-4-" to --dimethoxyphenyl)-cycloheptyl]-4- --; Column 2, line 40, correct "R!" to --$R_1$--; Column 2, line 55, correct "'lower-alkanyl'" to --"lower-alkanoyl"--; Column 3, line 30, correct "cycloalkyenamine" to --cycloalkenamine--; Column 5, line 59, correct "1-[N-4-(4-phenylbutyl)" to -- 1-[N-(4-phenylbutyl) --; Column 10, line 12, correct "$C_{18}H_{26}N_2O$:" to --$C_{18}H_{26}N_2O_2$:--; Column 12, line 29, correct "2-morpholinocycloheptyl)" to --(2-morpholinocycloheptyl)--; Column 15, line 59, correct "4-methoxy-2-[2-methyl-anilino)" to -- 4-methoxy-2-[2-(N-methylanilino)--.

SIGNED AND
SEALED
JAN 26 1971

(SEAL)
Attest:

Edward M. Fletcher, Jr.
Attesting Officer

WILLIAM E. SCHUYLER, JR.
Commissioner of Patents